(12) United States Patent
Yang et al.

(10) Patent No.: US 10,423,281 B2
(45) Date of Patent: Sep. 24, 2019

(54) SCREEN CONTACT DETECTION USING TOTAL INTERNAL REFLECTION

(71) Applicant: Hewlett-Packard Development Company, L.P., Houston, TX (US)

(72) Inventors: Wei-Shan Yang, Shanghai (CN); Irwan Halim, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/506,853

(22) PCT Filed: Aug. 27, 2014

(86) PCT No.: PCT/CN2014/085256
§ 371 (c)(1),
(2) Date: Feb. 27, 2017

(87) PCT Pub. No.: WO2016/029376
PCT Pub. Date: Mar. 3, 2016

(65) Prior Publication Data
US 2017/0285872 A1  Oct. 5, 2017

(51) Int. Cl.
*G06F 3/042* (2006.01)
*G06F 3/041* (2006.01)

(52) U.S. Cl.
CPC .......... *G06F 3/0421* (2013.01); *G06F 3/0416* (2013.01); *G06F 3/0428* (2013.01); *G06F 2203/04109* (2013.01)

(58) Field of Classification Search
CPC ........ G06F 3/042–3/0428; G06F 2203/04019; G06F 2203/04014
See application file for complete search history.

(56) References Cited

U.S. PATENT DOCUMENTS

| | | | |
|---|---|---|---|
| 7,099,553 | B1 | 8/2006 | Graham et al. |
| 7,432,893 | B2 | 10/2008 | Ma et al. |
| 7,705,835 | B2 | 4/2010 | Eikman |
| 8,094,137 | B2 | 1/2012 | Morrison |
| 8,144,271 | B2 | 3/2012 | Han |
| 2001/0028344 | A1* | 10/2001 | Iwamoto ............... G06F 3/0423 345/175 |
| 2006/0227120 | A1 | 10/2006 | Eikman |

(Continued)

FOREIGN PATENT DOCUMENTS

| | | |
|---|---|---|
| CN | 1853159 | 10/2006 |
| CN | 1853160 | 10/2006 |

(Continued)

OTHER PUBLICATIONS

Segal, et al.; "DIY Multi Touch Screen"; Microsoft Innovation Labs, Israel; 3 pages.

(Continued)

*Primary Examiner* — David Tung
(74) *Attorney, Agent, or Firm* — Trop, Pruner & Hu PC

(57) ABSTRACT

Examples are directed to detect screen contact using total internal reflection. One example involves detecting contact on a screen, the screen comprising total internal reflection of light; and determining, via at least one processor, a location of the contact on the screen based on a disturbance of the total internal reflection, the disturbance caused by the detected contact.

20 Claims, 10 Drawing Sheets

(56) References Cited

U.S. PATENT DOCUMENTS

| | | | |
|---|---|---|---|
| 2008/0150915 A1 | 6/2008 | Shibue et al. | |
| 2010/0271337 A1 | 10/2010 | Noh et al. | |
| 2010/0289755 A1 | 11/2010 | Zhu et al. | |
| 2011/0074735 A1* | 3/2011 | Wassvik | G06F 3/0421 345/175 |
| 2011/0157092 A1 | 6/2011 | Yang | |
| 2012/0002217 A1 | 1/2012 | Kobayashi et al. | |
| 2012/0153134 A1* | 6/2012 | Bergstrom | G06F 3/042 250/221 |
| 2012/0200538 A1* | 8/2012 | Christiansson | G06F 3/0418 345/175 |
| 2013/0285977 A1 | 10/2013 | Baharav et al. | |
| 2014/0055421 A1 | 2/2014 | Christiansson et al. | |
| 2014/0071094 A1 | 3/2014 | Holmgren et al. | |
| 2014/0146020 A1* | 5/2014 | An | G06F 3/0416 345/175 |
| 2014/0191110 A1 | 7/2014 | Holenarsipur | |

FOREIGN PATENT DOCUMENTS

| | | |
|---|---|---|
| CN | 101667084 | 3/2010 |
| CN | 102053761 | 5/2011 |
| CN | 102132230 | 7/2011 |
| CN | 102236478 | 11/2011 |
| CN | 102289331 | 12/2011 |
| CN | 102622135 | 8/2012 |
| CN | 203012671 | 6/2013 |
| CN | 103294282 | 9/2013 |
| CN | 103518184 | 1/2014 |
| CN | 103529998 | 1/2014 |
| EP | 1752864 | 2/2007 |
| EP | 2466429 | 6/2012 |
| KR | 101018397 B1 * | 2/2011 |

OTHER PUBLICATIONS

Han, J.Y., Multi-Touch Sensing through Frustrated Total Internal Reflection, Detecting multiple finger touches on a rear-projection surface dated on or before Jul. 22, 2014 (2 pages).

Noldus, What is CatWalk XT dated on or before Jul. 13, 2014 (3 pages).

Wikipedia, Total internal reflection dated on or before Apr. 1, 2014 (10 pages).

* cited by examiner

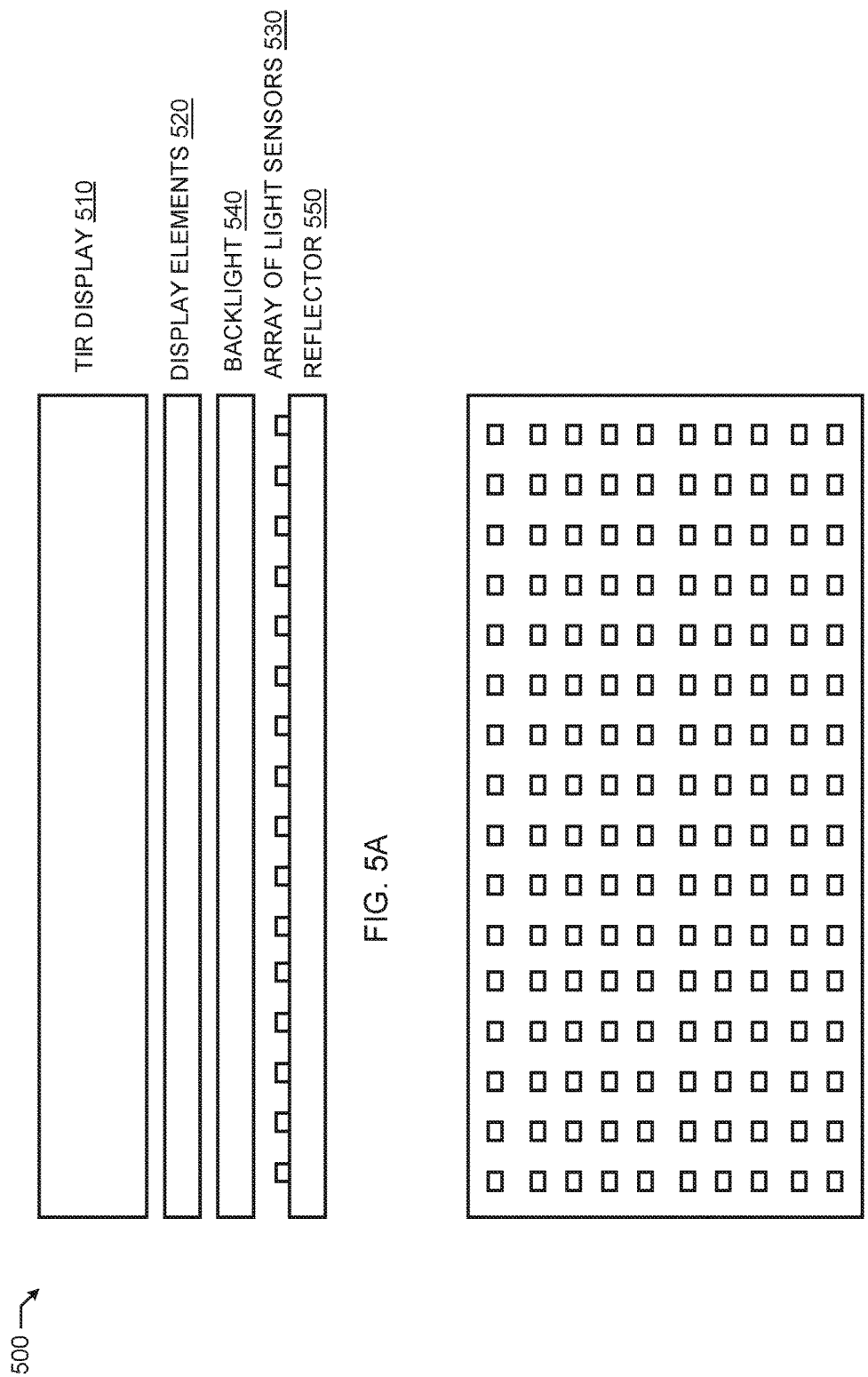

SCREEN CONTACT DETECTION USING TOTAL INTERNAL REFLECTION

CROSS-REFERENCE TO RELATED APPLICATION

This application is a U.S. National Stage Application of and claims priority to International Patent Application No. PCT/CN2014/085256, filed on Aug. 27, 2014, and entitled "SCREEN CONTACT DETECTION USING TOTAL INTERNAL REFLECTION," which is hereby incorporated by reference in its entirety.

BACKGROUND

Total internal reflection (TIR) is phenomenon that happens when a propagating wave (e.g., a light wave) hits a boundary of a medium (e.g., glass, acrylic, etc.) at an angle greater than a particular critical angle with respect to a normal of a surface of the medium. For TIR to occur, if a refractive index is lower on an opposite side of a boundary from which the wave is hitting the boundary and the incident angle is greater than the critical angle, the wave cannot pass through the boundary and is entirely reflected within the medium.

BRIEF DESCRIPTION OF THE DRAWINGS

FIG. 5A is a layer diagram of an example TIR display including an example array of light sensors on a back panel of the TIR display that may be implemented in in accordance with an aspect of this disclosure.

FIG. 5B is an overhead illustration of an example array of light sensors that may be used to implement the array of light sensors of FIG. 5A.

Figure 1:
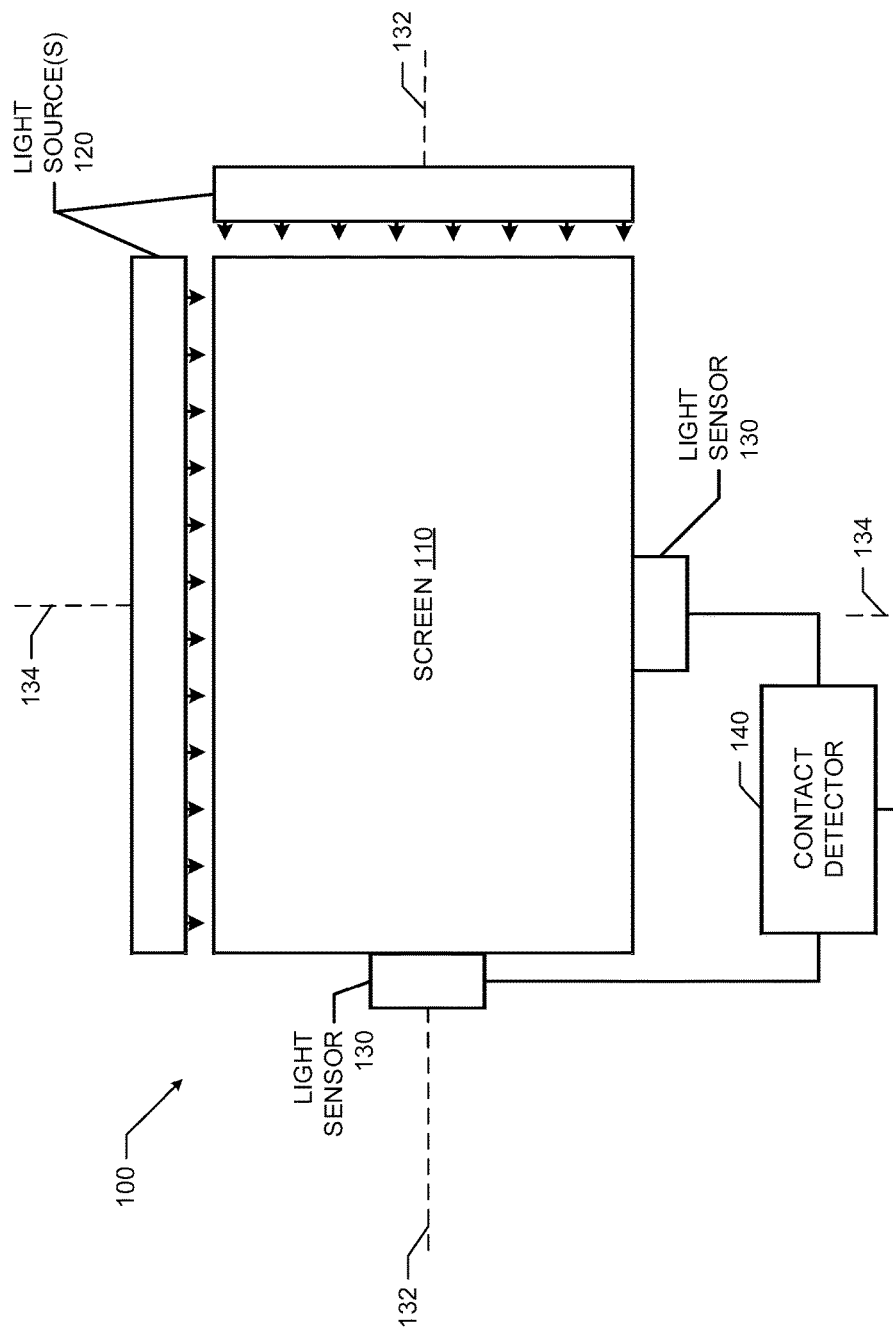
FIG. 1 illustrates a schematic diagram of an example total internal reflection (TIR) touch system that may be implemented in accordance with an aspect of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part or object is in contact with another part or object means that there is no intermediate part or space between the part(s) or object(s).

DETAILED DESCRIPTION

Example methods, apparatus, and articles of manufacture disclosed herein involve using total internal reflection (TIR) to detect contact with a display screen. An example method includes detecting contact on a screen including TIR of light and determining a location of the contact on the screen based on a disturbance of the total internal reflection, the disturbance caused by the detected contact.

In the examples disclosed herein, methods, apparatus, and articles of manufacture provide a touch display and/or touch system utilizing TIR of light within a screen. Examples disclosed herein provide efficient, cost effective methods and/or apparatus to implement a touch screen using light sources and light sensors. The light sources and light sensors may be configured on a display to measure and/or monitor the TIR of light within a screen. In many instances, previous techniques to implement touch screens on large displays (e.g., displays over 15 inches) can be relatively cost prohibitive. Examples disclosed herein may be more cost effective and efficient over previous techniques to provide touch technology to display devices regardless of size.

FIG. 1 illustrates a schematic diagram of an example total internal reflection (TIR) system 100. The example TIR system of FIG. 1 includes a screen 110, light source(s) 120, light sensor(s) 130, and a contact detector 140. In the illustrated example of FIG. 1, the light sources 120 project light into the screen causing TIR of the light within the screen 110. The light sensors 130 are located on a first axis 132 (e.g., an 'x' axis) and a second axis 134 (e.g., a 'y' axis) of the screen 110. The light sensors 130 measure the light within the screen 110 and the contact detector 140 determines whether contact is made with the screen 110 (e.g., a user touches the screen) based on measured light from the light sensors 130.

In the illustrated example of FIG. 1, the light sensors 130 are located on the first and second axes 132, 134 of the screen 110. The example first and second axes 132, 134 may be x,y axes of a plane of the screen 110 (e.g., a plane parallel to a surface of the screen 110), and accordingly may meet at a center point of the screen 110. In other examples, the light sensors 130 may be located off the axes 132, 134. Furthermore, in the illustrated example of FIG. 1, a single light sensor 130 is illustrated along a first edge and along a second edge of the screen 110 opposite the light sources 120. Each singular light sensor 130 may be used individually or in combination to detect contact and/or a location of the contact on the screen 110. In some examples, the light sensors 130 may be located on a same edge as the light sources 120. For example, the light sensors 130 and/or the light sensors may be collocated within a same housing.

In the illustrated example of FIG. 1, the screen 110 may be any type of medium for use with TIR. For example, the screen 110 may be glass, acrylic, plastic, etc. The example light sources 120 of FIG. 1 may be any light emitting device, such as a light emitting diode, incandescent light, fluorescent light, etc. The example light sources 120 may direct light into an edge of the screen 110 to cause the light to be captured within the screen 110, causing TIR. For example, the light sources 120 may emit light on a designated angle (e.g., an angle greater than a critical angle relative to a normal of a surface of the screen 110). In some examples, light shelters (see FIGS. 6A-6B) may be implemented to adjust and/or cause the light sources 120 to emit light at a designated angle into an edge of the screen 110. Each of the light sources 120 in the illustrated example of FIG. 1 may include multiple light emitting devices (e.g., an array of light sources, a row of light sources, etc.). Accordingly, the light sources 120 are configured to cause TIR within the screen 110 of FIG. 1.

The example light sensors 130 measure and/or monitor the TIR of the light within the screen 110. In the illustrated example of FIG. 1, the light sensors 130 are located opposite the light sources 120. Accordingly, in FIG. 1 the light sensors 130 may measure light from light sources 120 opposite the corresponding light sensor 130 and/or light from light sources 120 on an adjacent side of the light sensor 130 when corresponding light is deflected, reflected, frustrated etc. due to a contact with the screen 110. The example light sensors 130 of FIG. 1 may be configured based on their corresponding locations along adjacent edges of the screen 110. Configurations of the light sensors 130 may cause how the light sensors measure light from the light sources 120 and/or detect contact with the screen. Example configurations may vary due to adjusting/including a lens of the sensor 130, a medium of the lens of the sensor 130, a structure (e.g., shape, material, size, width, etc.) of the lens of the sensor 130, a filter of the sensor 130, an angle of the sensor 130 relative to an edge of the screen 110, etc. Example configurations, as disclosed herein, may be automatically and/or mechanically adjustable. For example, mechanical devices may be used to adjust a lens angle, a lens aperture, a filter width, a filer characteristic, and angle of the sensor 130, a location of the sensor 130, etc. Such adjustments and/or configurations may be made based on an environment (e.g., ambient lighting, location, etc.) of the screen 110.

Figure 2A:
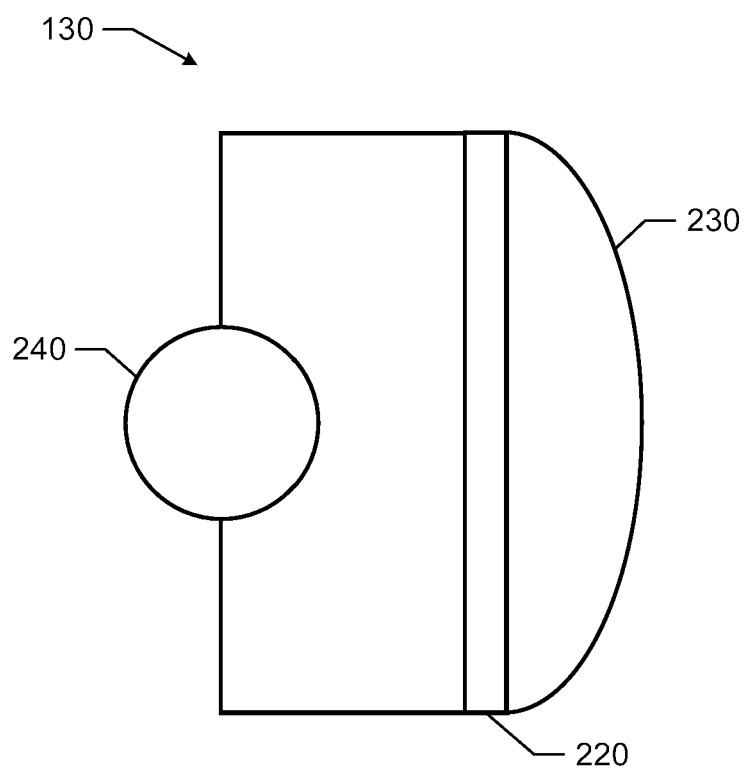
FIG. 2A illustrates an example light sensor that may be implemented by the TIR touch system of FIGS. 1 and/or 2.

An example light sensor 130 is illustrated in FIG. 2A. The example light sensors 130 of FIG. 2A includes a light filter 220, a lens 230, and a mechanism 240. The light filter 220 may cause the light sensor 130 of FIG. 2A to detect particular wavelength(s) of light (e.g., light caused by at least one of the light sources 120 and/or at least one reflection of light from the light sources 120). The light filter 220 may be any type of material (e.g., glass, plastic, acrylic, etc.) and characteristics of the filter 220 may be adjusted to adjust the particular wavelengths that are to be detected by the light sensor 130. The example mechanism 240 may be a motor or any other type of device that may be used to adjust a configuration (e.g., a structure of the light sensor 130, the lens 230, the filter 220, a location of the light sensor 130, an angle of the light sensor 130, etc.). The light sensors 130 of FIGS. 1 and/or 2A may measure at least one of a voltage of light measured within the screen 110, an angle of light at which the light sensor 130 receives light and/or light wave(s) within the screen 110, an intensity of the light and/or light wave(s) within the screen 110, a frequency of light and/or light wave(s) within the screen 110.

Figure 2B:
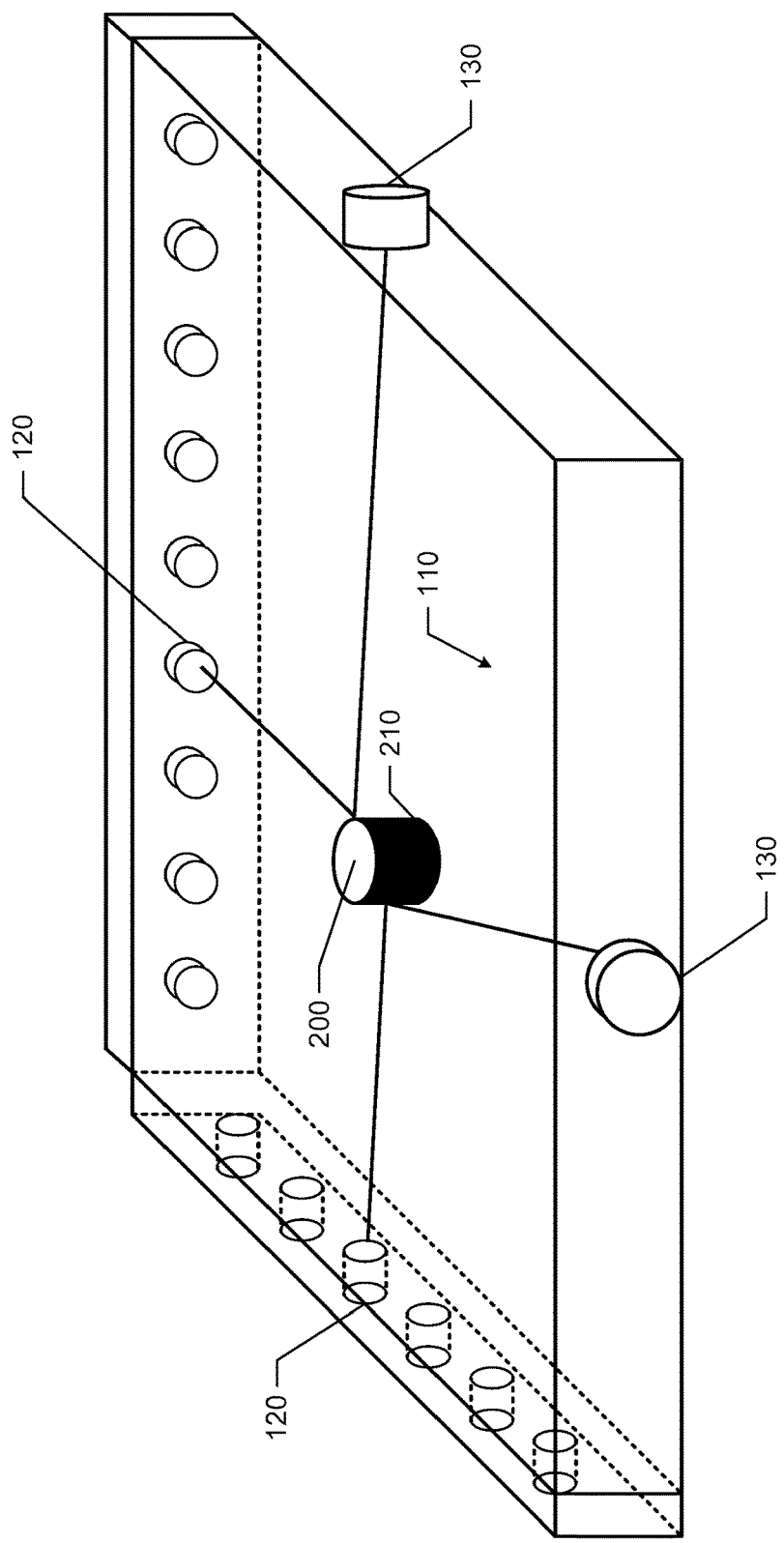
FIG. 2B is an isometric illustration of an example TIR touch system that may be used to implement the TIR touch system of FIG. 1.

The light sensors 130 may detect a disturbance in the TIR due to contact (e.g., from a user) with a surface of the screen 110. For example, referring to the illustrated example of FIG. 2B, if a user touches the screen 110 at touch point 200, a phenomenon causes a disturbance 210 (e.g., a shadow, a light/light wave blockage, a light absorber, etc.) in the TIR of the light within the screen 110 to deflect off of and/or around the disturbance caused by contact at the touch point 200. Accordingly, in the illustrated example of FIG. 2, light beams 220 from the light sources 120 may be detected by the light sensors 130. The example light sensors 130 of FIG. 2B may then forward such information to a contact detector (e.g., the contact detector 140 of FIG. 1) for analysis of the contact.

Referring back to FIG. 1, the light sensors 130 forward light measurements (e.g., angles, frequencies, intensities, etc.) to the contact detector 140. The example contact detector 140 analyzes the received light information to determine whether the screen 110 was contacted (e.g., touched, tapped, accessed, etc.), and if so, where on the screen 110 the contact occurred (e.g., a location and/or coordinates of a location). In some examples, the contact detector 140 may forward information corresponding to a determined contact (e.g., a touch from a user) to a control device (e.g., a processor) for control of a device (e.g., a computer, a tablet, a smartphone, etc.).

Figure 3:
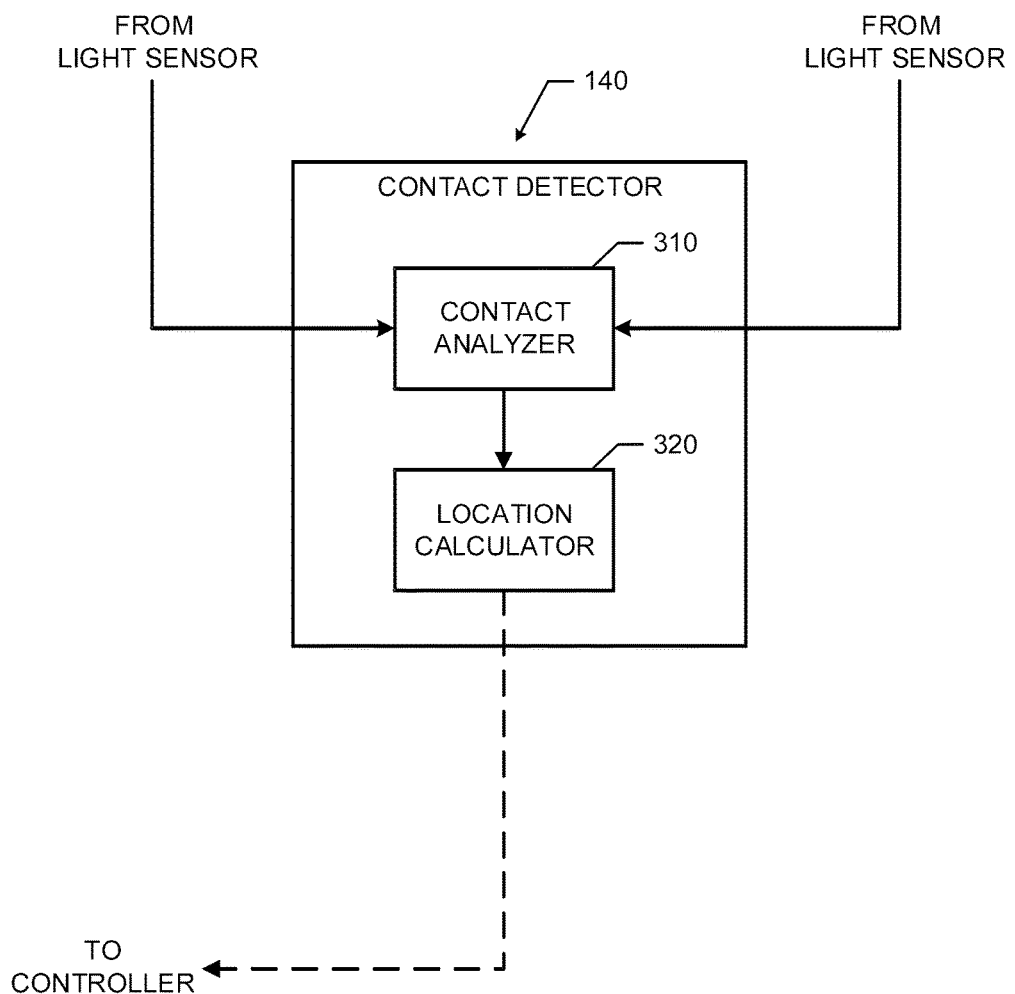
FIG. 3 is a block diagram of an example contact detector that may be implemented by the TIR touch system of FIGS. 1 and/or 2.

FIG. 3 is a block diagram of an example contact detector 140 that may be used to implement the contact detector 140 of FIG. 1. The example contact detector 140 of FIG. 3 includes a contact analyzer 310 and a location calculator 320. The example contact analyzer 310 of FIG. 3 analyzes information received from light sensors (e.g., the light sensors 130) to determine whether contact has been made with the screen 110 (e.g., with the surface of the screen 110). The example contact analyzer 310 of FIG. 3 forward the information and/or analysis of the information to the location calculator 320 to determine a location on the screen 110 where the contact occurred.

In the illustrated example of FIG. 3, the contact analyzer 310 receives light measurements (e.g., light angles, light frequencies, light intensities, etc.) from the light sensors 130. The example contact analyzer 220 may determine that contact is made from the screen 110 based on the received light information. For the example, the contact analyzer 310 may determine that contact was made with the screen 110 when there is a change in the light information (e.g., due to a disturbance, such as the disturbance 210 of FIG. 2, in the TIR of the screen 110).

In some examples, the contact analyzer 310 implements a filter to account for "false touches" or "false contacts" that may be caused by noise or interference in the TIR of the light within the screen 110. For example, the filter may enable the contact analyzer 310 to determine that detected contact was a user touching a screen versus another type of contact (e.g., an object that unintentionally comes into contact with the screen 110). Accordingly, the filter may be used to analyze a characteristic of the disturbance (e.g., the disturbance 210 of FIG. 2). For example, the characteristic of the disturbance may be a length of time of the disturbance, a type of the disturbance, a size of the disturbance, a shape of the disturbance, etc. In some examples, the contact analyzer 310 may be analyze light based on the presence and or absence of light filters (e.g., glass, lenses, etc.) located on and/or associated with the light sensors 130. Accordingly, the contact analyzer 310 may be used to detect contacts and/or confirm intentional contacts by a user based on light information received from the light sensors 130.

In some examples, the contact analyzer 310 may instruct the light sensors 130 to adjust configurations to detect contact on the screen. For example, in response to receiving several inconclusive measurements (e.g., due to an amount of ambient light surrounding the screen 110), the contact analyzer 310 may instruct the light sensors to adjust an angle and/or a characteristic of the filter (e.g., a width of the filter on the light sensor 130, a hue of the filter 130, etc.). In another example, the contact analyzer 310 may instruct the light sensors 130 to adjust configurations of the light sensors 130 in response to detecting a type of contact in order to focus a lens and/or angle of the light sensor 130 on a corresponding area of the screen where the contact was detected. In such an example, the light sensors 130 may provide more accurate light measurements on a type of contact that is detected (e.g., based on the disturbance in the TIR).

The example location calculator 320 of FIG. 3 determines a location on the screen 110 where a contact (e.g. a user's touch) occurred. The location calculator uses measurement(s) received by the contact detector 140 from the light sensors 130. Based on the measurement(s), the location calculator 320 can determine a location (e.g., coordinates, such as x-y coordinates) on the screen that the contact occurred. For example, referring back to FIG. 2, the light sensors 130 may determine from which particular light source 120 a measured light beam designated originated. In other examples, the light sensors 130 analyze a change (e.g., a disturbance) in the TIR based on the amount of measured light within the screen 110 to determine the location of the contact. Any suitable techniques may be used to calculate the location of the contact (e.g., the contact point 200) in accordance with the teachings of this disclosure. In some examples, the location calculator 320 forwards the location information to a controller (e.g., a processor) for control of a device (e.g., a computer, a tablet computer, a smartphone, etc.).

While an example manner of implementing the contact detector 140 of FIG. 1 is illustrated in FIG. 3, at least one of the elements, processes and/or devices illustrated in FIG. 3 may be combined, divided, re-arranged, omitted, eliminated and/or implemented in any other way. Further, the contact analyzer 310, the location analyzer 320, and/or, more generally, the example contact detector 140 of FIG. 3 may be implemented by hardware, software, firmware and/or any combination of hardware, software and/or firmware. Thus, for example, any of the contact analyzer 310, the location analyzer 320, and/or, more generally, the example contact detector 140 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the contact analyzer 310 and/or the location analyzer 320 is/are hereby expressly defined to include a tangible computer readable storage device or storage disk such as a memory, a digital versatile disk (DVD), a compact disk (CD), a Blu-ray disk, etc. storing the software and/or firmware. Further still, the example contact detector 140 of FIG. 3 may include at least one element, process, and/or device in addition to, or instead of, those illustrated in FIG. 3, and/or may include more than one of any or all of the illustrated elements, processes and devices.

Figure 4:
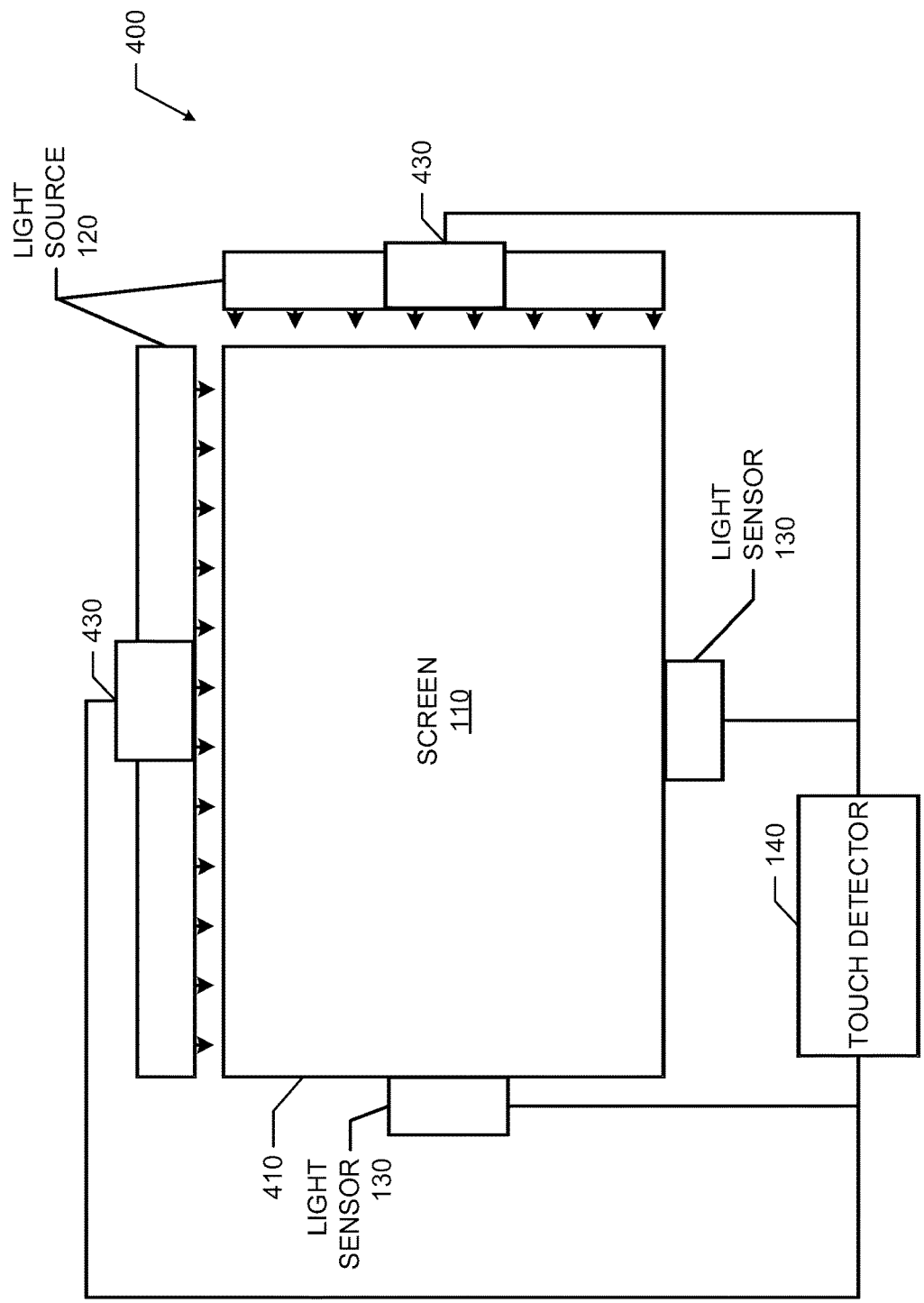
FIG. 4 is a schematic diagram of another example TIR touch system that may be implemented in accordance with an aspect of this disclosure.

FIG. 4 is a schematic diagram of another example TIR touch system 400 that may be implemented in accordance with an aspect of this disclosure. The example TIR touch system 400 may be used to implement the example TIR touch system 100 of FIG. 1. In the illustrated example of FIG. 4, light sensors 430 are included in addition to the light sensors 130. Accordingly, both the light sensors 430 and the light sensors 130 may be used to measure the TIR of the light within the screen 110 of FIG. 4. In some examples, the TIR touch System 400 of FIG. 4 may provide more accurate measurements of the light and/or the TIR of the light in screen 110 than the TIR touch system 100 of FIG. 1. In other examples, light sensors in addition to the light sensors 130, 430 may be implemented to measure light and/or the TIR of the light within the screen 110.

FIG. 5A is a layer diagram of yet another example TIR touch system 500 including an example array of light sensors 530 on a back panel of a TIR display 510 that may be implemented in accordance with an aspect of this disclosure. The example TIR display 510 may be used to implement the screen 110 of FIGS. 1 and/or 4. The example TIR touch system 500 of FIG. 5 includes a display elements layer 520, a backlight layer 540, and a reflector 550. The example display elements 520 (e.g., LCDs, LEDs, OLEDs, etc.) may present images on the TIR display 510.

The example TIR touch system 500 may be implemented by any type of display device in accordance with the teachings of this disclosure. Accordingly, the backlight layer 540 may emit light (e.g., directly and/or reflected off the reflector 550) into the TIR display 510 at an angle such that light from the backlight causes TIR in the TIR display 510.

The example array of light sensors 530 of FIG. 5A may monitor the light and/or the TIR of the light in the TIR display 510 in accordance with the teachings of this disclosure. FIG. 5B is an overhead illustration of the example array of light sensors 530 that may be used to implement the array of light sensors of FIG. 5A. The array of light sensors 530 in the illustrated example of FIGS. 5A and/or 5B may be used additionally or alternatively to the light sensors 130 and/or the light sensors 430 of FIGS. 1 and/or 4 respectively. Accordingly, the array of light sensors 530 may provide measurement information to a contact detector (e.g., the contact detector 140) to determine whether the TIR display 510 is contacted or touched by a user.

The example TIR touch system 500 of FIG. 5A enables a user to touch and/or select objects on the TIR display 510 that are presented by the display elements 520. Accordingly, the array of light sensors 530 may be used to determine which objects presented by the display elements was touched and/or selected.

Figure 6A:
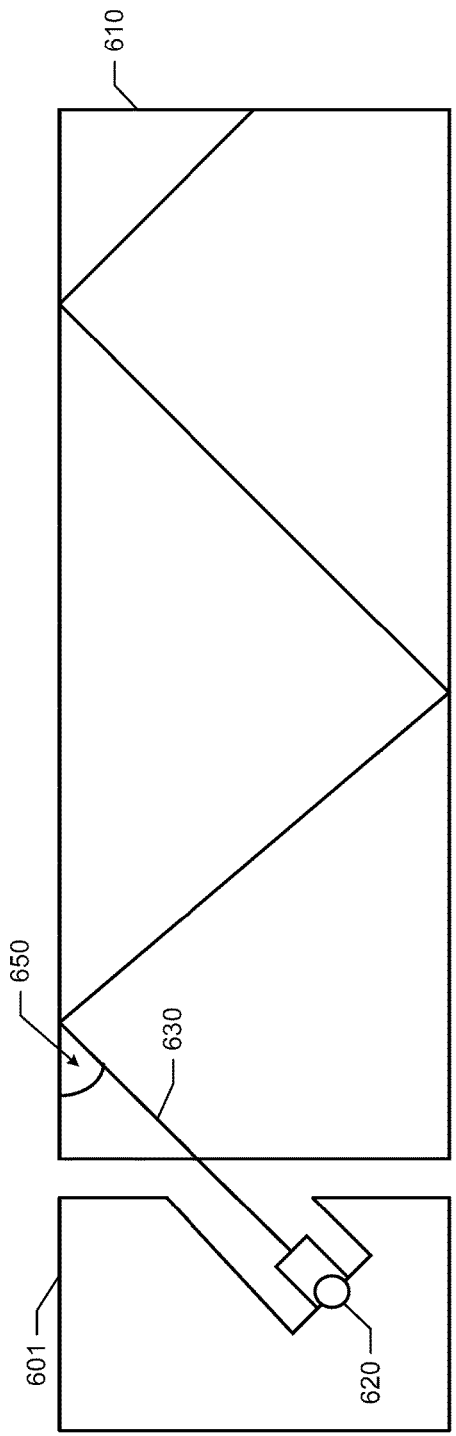
FIG. 6A-6B illustrate example light shelters that may be implemented in the TIR touch systems of FIGS. 1, 4, and/or 5A.
Figure 6B:
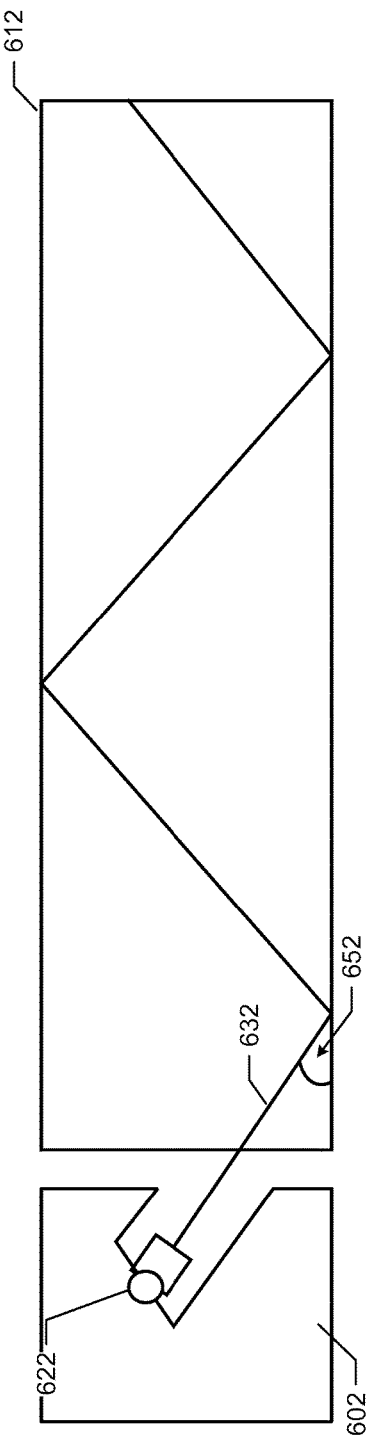

FIG. 6A-6B illustrate example light shelters 601 and 602 that may be implemented in the TIR touch systems 100, 400, 500 of FIGS. 1, 4, and/or 5A. In the illustrated example of FIG. 6, the example light shelters 601, 602 are used to adjust and/or focus light emitted by the light sensors 120. In FIG. 6A, the light shelter 601 causes the light source 620 upward to direct light 630 into the screen 610 at the designated angle 650. In FIG. 6B, the light shelter 602 causes the light source 622 to direct light 632 downward into the screen 612 at an angle 652.

The example shelters 601, 602 of FIGS. 6A and 6B may include mechanical devices (e.g., motors, actuators, etc.) and/or optical devices (e.g., mirrors, lenses, etc.) to control the direction light is emitted by the light sources 620, 622. In some examples, the light shelters 601, 602 may be adjusted (e.g. automatically and/or manually) based on characteristics of the screens 610, 612. The light shelters 601, 602 in the illustrated example of FIGS. 6A and 6B may be implemented side-by-side in the TIR touch systems 100, 400, 500 of FIGS. 1, 4, and/or 5A. For example, pairs of the light sources 620, 622 may line one or more sides of the screen 110 of FIGS. 1 and/or 4 or a row in the backlight of FIG. 5A. Accordingly, in such an example, light is projected in alternating directions within the screen 110 to cause TIR.

Figure 7:
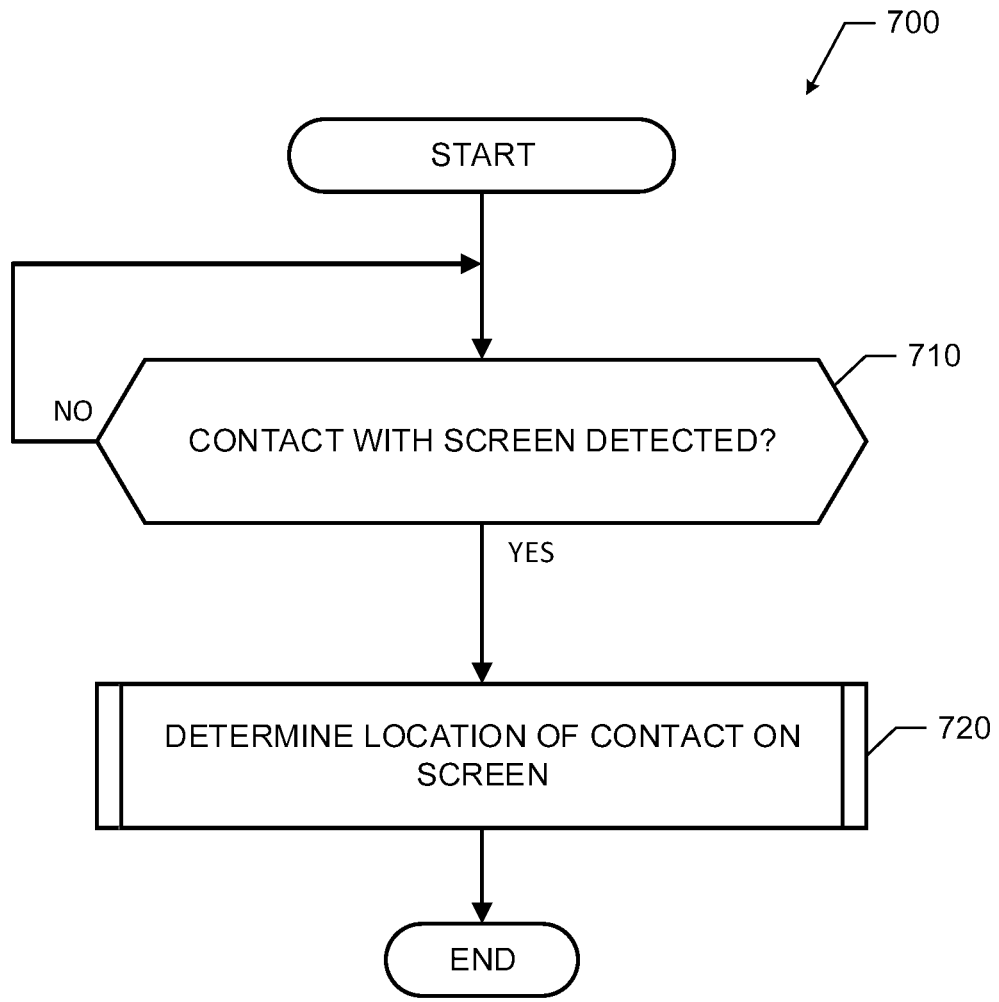
FIG. 7 is a flowchart representative of example machine readable instructions that may be executed to implement the contact detector of FIG. 3.

Flowcharts representative of example machine readable instructions for implementing the contact detector 140 of FIG. 3 are shown in FIGS. 7 and/or 8. In this example, the machine readable instructions comprise program(s)/process(es) for execution by a processor such as the processor 912 shown in the example processor platform 900 discussed below in connection with FIG. 9. The program(s)/process(es) may be embodied in software stored on a tangible computer readable storage medium such as a CD-ROM, a floppy disk, a hard drive, a digital versatile disk (DVD), a Blu-ray disk, or a memory associated with the processor 912, but all of the program(s)/process(es) and/or parts thereof could alternatively be executed by a device other than the processor 912 and/or embodied in firmware or dedicated hardware. Further, although the example program(s)/process(es) are described with reference to the flowcharts illustrated in FIGS. 7 and/or 8, many other methods of implementing the example contact detector 140 may alternatively be used. For example, the order of execution of the blocks may be changed, and/or some of the blocks described may be changed, eliminated, or combined.

FIG. 7 is a flowchart representative of an example process 700 that may be executed to implement the contact detector of FIG. 3. The process 700 of FIG. 7 begins with an initiation of the contact detector 140 (e.g., upon startup of the TIR touch systems 100, 400, 500 of FIGS. 1, 4, and/or 5A, upon receiving instructions from a processor associated with the TIR touch systems 100, 400, 500 of FIGS. 1, 4, and/or 5A, etc.). At block 710 of FIG. 7, the contact analyzer 310 of FIG. 3 determines whether contact with a screen (e.g., the screen 110) was detected. For example, the contact analyzer 310 analyzes light measurements (e.g., angles, frequency, intensity, etc.) received from light sensors (e.g., the light sensors 130, 430, 530 of FIGS. 1, 4, 5A, and/or 5B). The example contact analyzer 310 may determine that contact has been made with the screen 110 based on changes in the light measurements and/or detected disturbances in the TIR of the light within the screen 110. If, at block 710, the contact analyzer 310 determines that contact has not been made with the screen 110, the contact analyzer 310 continues to monitor the light measurements (control returns to block 710).

Figure 8:
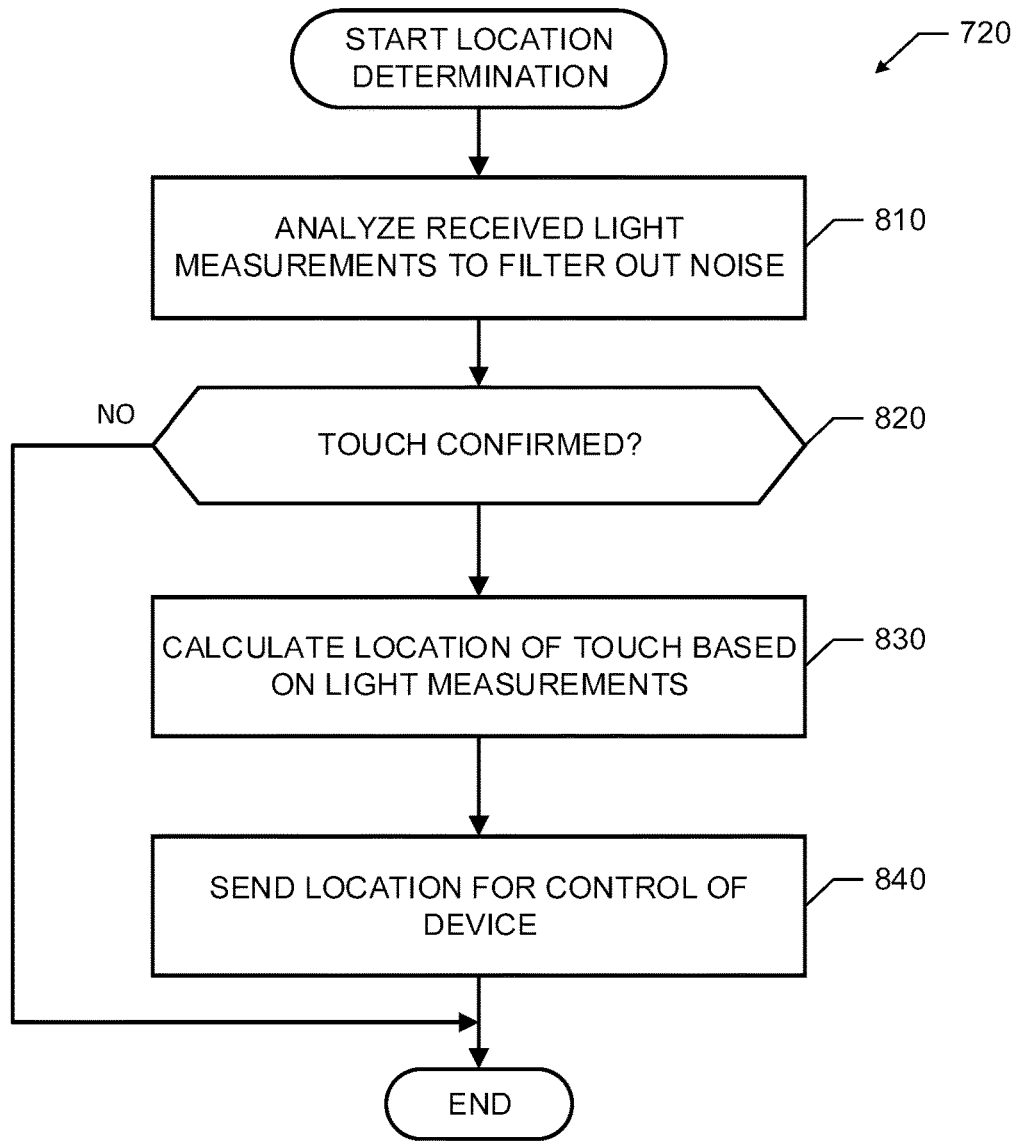
FIG. 8 is a flowchart representative of an example portion of the example machine readable instructions of FIG. 7 to implement the contact detector of FIG. 3.

If, at block 710 of FIG. 7, the contact analyzer 310 does determine that contact has been made with the screen 110, the location calculator 320 determines a location of the contact on the screen (see FIG. 8). In FIG. 7, after block 720, the process 700 ends. In some examples, the process 700 is iterative, and control returns to block 710 after block 720. In some examples, after block 720, the location calculator 320 forwards location information to a control device for control the TIR display system 100, 400, 500 and/or a computing device associated with the TIR display system 100, 400, 500.

FIG. 8 is a flowchart representative of an example process 720 that may be executed to implement block 720 of FIG. 7 to implement the contact detector 140 of FIG. 3. The process 720 of FIG. 8 begins with an initiation of the contact detector 140 of FIG. 3. At block 810, the contact analyzer 310 of FIG. 3 analyzes received light measurements to filter out noise (e.g., accidental touches, "false touches," "false contacts," etc.). Based on the analysis of block 810, the contact analyzer 310 may determine whether the contact was a touch or an intentional touch made by a user. For example, certain measurements may indicate a longer duration touch and/or particular touch on a part of a screen versus other measurements that may indicate a slight touch and/or a touch of an object versus a user's hand/finger. Accordingly, at block 820, the contact analyzer 310 determines whether a touch is confirmed from the analysis in block 810. If no touch is confirmed (e.g., minor and/or unintentional contact is measured/determined), the process 720 ends.

If, at block 820 of FIG. 8, the contact analyzer does confirm a touch occurred, the location calculator 320 calculates a location of the touch based on the light measurements (block 830). For example, at block 830, the location calculator may determine coordinates (e.g., x-y coordinates) of the screen 110 where the touch was made using the light measurements from the light sensors and/or the contact analyzer 310. At block 840, the location calculator 320 may send the calculated (determined) location to a control device to facilitate control of a computing device and/or a TIR display system. After block 840, the process 720 ends. In some examples, the process 720 is iterative, and control returns to block 810 after block 840.

As mentioned above, the example processes of FIGS. 7 and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7 and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element.

Figure 9:
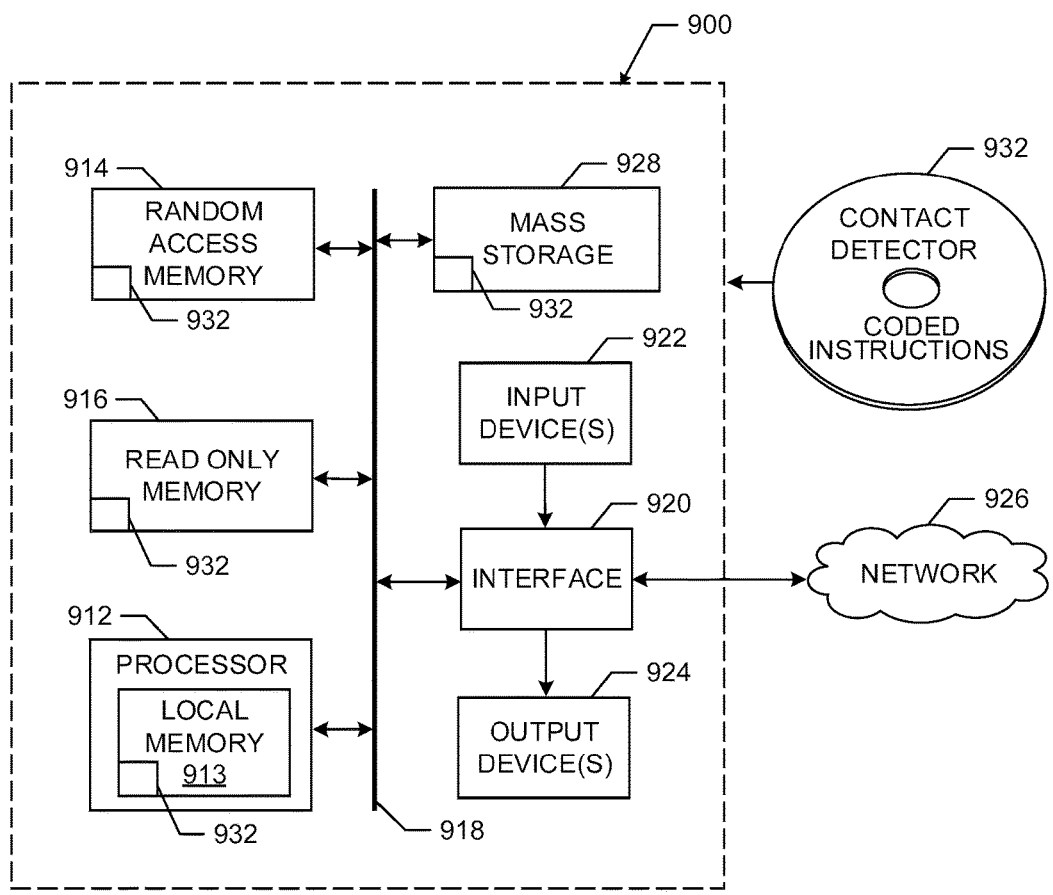
FIG. 9 is a block diagram of an example processor platform capable of executing the instructions of FIGS. 7 and/or 8 to implement the contact detector of FIG. 3.

FIG. 9 is a block diagram of an example processor platform 900 capable of executing the instructions of FIGS. 7 and/or 8 to implement the contact detector 140 of FIG. 3 The example processor platform 900 may be or may be included in any type of apparatus, such as a server, a personal computer, a mobile device (e.g., a cell phone, a smart phone, a tablet, etc.), a personal digital assistant (PDA), a gaming console, a personal video recorder, or any other type of computing device.

The processor platform 900 of the illustrated example of FIG. 9 includes a processor 912. The processor 912 of the illustrated example is hardware. For example, the processor 912 can be implemented by at least one integrated circuit, logic circuit, microprocessor or controller from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, at least one input device 922 is connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 924 is also connected to the interface circuit 920 of the illustrated example. The output device(s) 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers), such as the screen 110 of FIGS. 1, 2, 4, and/or 5A. The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes at least one mass storage device 928 for storing software and/or data. Examples of such mass storage device(s) 928 include floppy disk drives, hard drive disks, compact disk drives, Blu-ray disk drives, RAID systems, and digital versatile disk (DVD) drives.

The coded instructions 932 of FIGS. 7 and/or 8 may be stored in the mass storage device 928, in the local memory 913 in the volatile memory 914, in the non-volatile memory 916, and/or on a removable tangible computer readable storage medium such as a CD or DVD.

From the foregoing, it will be appreciated that the above disclosed methods, apparatus and articles of manufacture involve detecting contact (e.g., touch) on a screen using total internal reflection (TIR) within the screen. Examples disclosed herein involve directing light into the screen to cause TIR, and measuring/monitoring the light via light sensors to determine whether contact is made with the screen. Based on disturbances in the TIR and/or measurements of light, examples disclosed herein determine a location of contact on the screen.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting a given contact on a screen comprising total internal reflection of light, the given contact detected via a first light sensor and a second light sensor, the first light sensor and the second light sensor located on a first axis and a second axis of a plane of the screen, respectively, and the given contact detected based on configurations of a first lens of the first light sensor and a second lens of the second light sensor, wherein the first axis is different from the second axis;
   determining, by at least one processor, a location of the given contact on the screen based on a disturbance of the total internal reflection, the disturbance caused by the detected given contact; and
   in response to determining an inconclusive measurement responsive to a contact made on the screen, adjusting, by the at least one processor, a structural configuration of at least one of the first and second light sensors based on use of a motor.

2. The method of claim 1, wherein the configurations of the first lens and the second lens comprise at least one of a lens structure, a lens medium, a lens filter, or a lens location.

3. The method of claim 1, wherein the disturbance of the total internal reflection comprises a blockage of a light wave causing the total internal reflection.

4. The method of claim 1, further comprising:
   analyzing a characteristic of the disturbance; and
   determining the given contact includes a touch by a user based on the characteristic of the disturbance.

5. The method of claim 4, wherein the characteristic of the disturbance comprises at least one of a length of time of the disturbance, a type of the disturbance, a size of the disturbance, or a shape of the disturbance.

6. The method of claim 4, wherein the analyzing comprises:
   determining, by the at least one processor, that the given contact is not a false contact based on a time duration of the disturbance.

7. The method of claim 4, wherein the analyzing comprises:
   determining, by the at least one processor, that the given contact is not a false contact based on a shape of the disturbance.

8. The method of claim 1, further comprising:
   causing the total internal reflection of light by sending a light wave into the screen, and
   adjusting an angle at which the light wave is sent into the screen based on a characteristic of the screen.

9. The method of claim 1, wherein the adjusting of the structural configuration comprises causing a change of an angle of at least one of the first and second light sensors.

10. The method of claim 1, wherein the adjusting of the structural configuration comprises causing a change of a width of a filter of at least one of the first and second light sensors.

11. An apparatus comprising:
a contact analyzer to:
  analyze light measurements from a first sensor on a first axis of a display screen and a second sensor on a second axis of the display screen to detect contact with the display screen, wherein the first axis is different from the second axis and the light measurements are made from light causing total internal reflection within the display screen, and
  in response to determining an inconclusive measurement responsive to the contact made on the display screen, adjust a structural configuration of at least one of the first and second sensors based on use of a motor; and
a location calculator to determine a location of the contact on the display screen based on the analyzed light measurements.

12. The apparatus of claim 11, wherein the location calculator is to provide the location of the contact to a controller for control of a device.

13. The apparatus of claim 11, wherein the contact analyzer comprises a filter to detect a false touch on the display screen based on a time duration or shape of the contact on the display screen.

14. The apparatus of claim 11, wherein the adjusting of the structural configuration comprises causing a change of an angle of at least one of the first and second sensors.

15. The apparatus of claim 11, wherein the adjusting of the structural configuration comprises causing a change of a width of a filter of at least one of the first and second sensors.

16. A non-transitory computer readable storage medium comprising instructions that, when executed, cause a machine to:
  analyze a total internal reflection of light within a touch screen to detect contact within the touch screen based on light measurements by a first sensor and a second sensor, the first sensor located on a first axis of the touch screen and the second sensor located on a second axis of the touch screen to detect the contact, wherein the first axis is different form the second axis;
  in response to determining an inconclusive measurement responsive to the contact made on the touch screen, adjust a structural configuration of at least one of the first and second sensors based on use of a motor; and
  determine a location of the contact in response to the analyzing detecting disruption of the total internal reflection of light in the touch screen.

17. The non-transitory computer readable storage medium of claim 16, wherein the instructions, when executed, further cause the machine to:
  analyze the light measurements received from the first and second sensors, wherein the light measurements indicate the total internal reflection of light is disrupted based on a change in the light measurements.

18. The non-transitory computer readable storage medium of claim 16, wherein the instructions, when executed, further cause the machine to:
  adjust light sources emitting light into the touch screen based on characteristics of the touch screen to cause the total internal reflection of the light.

19. The non-transitory computer readable storage medium of claim 16, wherein the adjusting of the structural configuration comprises causing a change of an angle of at least one of the first and second sensors.

20. The non-transitory computer readable storage medium of claim 16, wherein the adjusting of the structural configuration comprises causing a change of a width of a filter of at least one of the first and second sensors.

* * * * *